United States Patent [19]

Souby

[11] Patent Number: 4,980,140

[45] Date of Patent: Dec. 25, 1990

[54] SELECTIVE REMOVAL OF CARBONYL SULFIDE FROM A HYDROGEN SULFIDE CONTAINING GAS MIXTURE

[75] Inventor: Myra C. Souby, Houston, Tex.

[73] Assignee: Shell Oil Company, Houston, Tex.

[21] Appl. No.: 322,448

[22] Filed: Mar. 13, 1989

[51] Int. Cl.$^5$ .............. C01B 17/16; C01B 17/00; C01B 31/20; B01J 8/00

[52] U.S. Cl. ............................ 423/243; 423/228; 423/245.2

[58] Field of Search ............ 423/243, 228, 245.2

[56] References Cited

U.S. PATENT DOCUMENTS

| | | | |
|---|---|---|---|
| 4,233,141 | 11/1980 | Beavon et al. | 208/236 |
| 4,240,923 | 12/1980 | Sartori et al. | 252/187 |
| 4,332,596 | 6/1982 | Ranke et al. | 55/18 |
| 4,336,232 | 6/1982 | Appl et al. | 423/228 |
| 4,372,925 | 2/1983 | Cornelisse | 423/228 |
| 4,452,763 | 6/1984 | Van De Kraatz et al. | 423/228 |
| 4,484,934 | 11/1984 | Ferrin et al. | 55/32 |
| 4,504,449 | 3/1985 | Doerges et al. | 423/228 |
| 4,609,388 | 9/1986 | Adler et al. | 62/12 |
| 4,609,389 | 9/1986 | Karwat | 62/17 |
| 4,711,648 | 12/1987 | Konkol | 55/73 |
| 4,749,555 | 6/1988 | Bush | 423/228 |

FOREIGN PATENT DOCUMENTS

| | | | |
|---|---|---|---|
| 764890 | 8/1967 | Canada | 423/228 |
| 660875 | 3/1965 | United Kingdom . | |
| 1153786 | 5/1969 | United Kingdom . | |

*Primary Examiner*—Gregory A. Heller

[57] ABSTRACT

Gas mixtures containing $H_2S$ are treated to selectively remove COS by using a selective solvent containing $H_2S$, usually obtained by understripping loaded solvent during regeneration.

13 Claims, No Drawings

SELECTIVE REMOVAL OF CARBONYL SULFIDE FROM A HYDROGEN SULFIDE CONTAINING GAS MIXTURE

BACKGROUND OF THE INVENTION

1. Field of the Invention

The present invention relates to a process for the selective removal of carbonyl sulfide from a gas mixture also containing hydrogen sulfide.

2. Description of the State of the Art

In the purification of gas mixtures, e.g., natural gas, by absorption to remove minor amounts of undesirable contaminants, it is desirable for highest gas purification to regenerate the absorbent to expel as much as possible of the contaminants to provide the leanest possible absorbent for recycle.

In conventional methods of purification of gas mixtures containing carbonyl sulfide and hydrogen sulfide, both gases are cosorbed by the absorbent and in the desire to provide lean solvent recycle both are expelled to the greatest extent possible on regeneration, usually by steam stripping. This is true even when the gas to be treated comprises a major amount of or is principally hydrogen sulfide gas.

It is desirable to selectively remove carbonyl sulfide from a gas mixture also containing hydrogen sulfide with reduced cosorption of large amounts of hydrogen sulfide. It is also desirable to reduce any steam requirements for regeneration of sorbent solution.

SUMMARY OF THE INVENTION

The present invention is directed to a process for the selective removal of carbonyl sulfide from a gas mixture also comprising hydrogen sulfide which comprises (a) contacting the gas mixture with an absorbent comprising a tertiary amine, a physical co-solvent and a minor amount of water: (b) regenerating the loaded absorbent to remove substantially all of the carbonyl sulfide and most of the hydrogen sulfide to provide a lean absorbent containing hydrogen sulfide in an amount of from 0.2% w to 2.0% w; and (c) recycling the lean absorbent to the contacting step (a).

Use of the above process unexpectedly results in reducing the steam requirement in absorbent regeneration, reducing the temperature rise in absorption, increasing the rate of removal of carbonyl sulfide and reducing the cosorption of hydrogen sulfide.

The tertiary amine (a) can take the form of an optionally substituted aliphatic, cycloaliphatic, aryl or (aryl)-heterocyclic tertiary amine, which is conventionally known in the art as a sorbent for removal of sulfides from gases.

In one embodiment of the invention, the tertiary amine is a lower aliphatic amine containing from 1 to 10 carbon atoms and, especially is a mono- or poly-lower alkanol amine containing 1 to 3 carbon atoms in each alkyl group, for example, dimethylethanolamine, methyldiethanolamine, methyldipropanolamine, methyldiisopropanolamine, ethyldiethanolamine, ethyldipropanolamine, ethyldiisopropanolamine, triethanolamine, dipropylethanolamine, propyldiethanolamine, isopropyldiethanolamine, dipropylethanolamine, diisopropylethanolamine, propyldipropanolamine, propyldiisopropanolamine, isopropyldipropanolamine, isopropyldiisopropanolamine, and the like. Preferably, the tertiary amine is triethanolamine and, especially, methyldiethanolamine.

The physical co-solvent includes conventional solvents such as sulfones, sulfoxides, glycols and the mono- and diethers thereof, 1,3-dioxo heterocyclic compounds (dioxane and dioxolane), aromatic ethers, aromatic hydrocarbons and N-alkylated lactams of gamma or omega amino acids. The latter are preferred and include lower N-alkylated pyrrolidones and piperidones which also can be substituted by 1 or 2 lower alkyl piperidones, which also can be substituted by 1 or 2 lower alkyl groups containing 1 to 4 carbon atoms on the heterocyclic ring. N-methylpyrrolidone is preferred. The third component (c) is water present in the composition is a minor amount of from about 5% w to about 15% w.

The ratio of ingredients (a), (b) and (c) in the sorbent solution of the invention are varied independently within the ranges specified below. For example, the ratios can be: (a) from about 35% w to about 55% w of tertiary amine., (c) from about 5% w to about 15% w of water., and the balance being co-solvent (b). The percentages are by weight of ingredient based on the total weight of the sorbent solution. In one embodiment of the invention, the ratio of ingredients is (a) from about 40% w to about 50% w each of tertiary amine and co-solvent., (c) from about 7.5% w to about 12% w water co-solvent (b). Preferably, the ratio of ingredients is (a) and (b) each about 45% tertiary amine and physical co-sorbent ; and (c) the balance being water. All compositions of the three components must meet the following general requirements: (1) the sorbent solution must have low enough viscosity to achieve effective mixing., (2) the sorbent solution must form a substantially immiscible phase with $H_2S$.

The sorption is conducted under conventional contacting conditions of temperature, pressure and vessel flow designs and rates used in the gas purification art. The temperature and pressure of the sorption are not critical and are conventionally known in the gas treating art. By way of illustration, the temperature is conveniently above 120° F. and the pressure can be above atmospheric, such as 5-300 p.s.i.g. Lower and higher conventional conditions are not excluded.

The loaded solvent is regenerated (desorbed) in a conventional manner, usually by transfer to a separate regeneration zone or vessel. Substantially all of the COS removed from the loaded solvent by regeneration, while still leaving in the solvent the desired amount of $H_2S$ defined by the invention, will vary to some degree based on the method of regeneration used and the operating conditions thereof and will usually be less than a few hundred p.p.m. by w of COS in the recycle solvent. Regeneration usually involves heating the solvent preferably under reduced pressure and/or inert gas ($N_2$) or steam sparging of the solvent and the like. In one embodiment of the invention, the solvent is regenerated by steam stripping in which moisture remains in a closed cycle in the stripper. The desired amount of $H_2S$ in the solvent can be provided or maintained in the sorbent recycle by controlling the regeneration process to "understrip" $H_2S$ from the "lean" sorbent. In steam regeneration, this is readily accomplished by lowering the reboiler steam rate to leave the desired amount of $H_2S$ in the solvent while still being able to achieve sufficient COS stripping of the gas stream. In one embodiment of the invention, the steam rate is from about 0.1 to about 1.5 lb of steam/gal and, preferably, from about 0.1 to about 0.5 lb of steam per gallon of solvent. Preferably, the amount of $H_2S$ in the solvent recycle from regeneration is from about 0.2% w to about 1.5% w, and especially from about 0.2% w to about 0.5% w.

While the invention has been illustrated with tray contact absorption and regeneration zones and corresponding apparatus, those skilled in the art will appreciate that, except where specified, other equivalent or analogous units may be employed. The terms "steps" or "zones," as employed in the specification and claims, includes where suitable, the use of segmented equipment operated in series, or the division of one unit into multiple units because of size constraints, etc. For example, for fully continuous operation, an absorption column might comprise two separate columns in which the solution from the lower portion of the first column would be introduced into the upper portion of the second column, the gaseous material from the upper portion of the second column being fed into the lower portion of the first column. Parallel operation of units, is of course, well within the scope of the invention.

The gas mixture to be treated can be from a variety of conventional sources and can also contain $CO_2$. Examples of gases include natural gas, fuel gas, synthesis gas and the like.

ILLUSTRATIVE EMBODIMENT

The following embodiments are provided to illustrate the invention but should not be regarded as limiting it in any way.

EMBODIMENT 1

A gas stream was subjected to conventional selective absorption using an aqueous solution of 45% w each of methyl diethanol amine and N-methyl pyrrolidone at 120° F. The loaded solvent was subjected to steam stripping in a conventional regenerator.

Two Operating Periods with Different $H_2S$ Loadings in Solvent

During the first experiment A, the H2S loading in the lean solvent was adjusted to higher than normally used in an industrial gas treating plant by use of a lower steam rate. In the second experiment B, the $H_2S$ loading came within the range of commercial values. Table 1 presents the two sets of experimental data collected from the two experimental periods (A and B) mentioned above. Experiment A represents the invention of the use of the higher $H_2S$ loaded solvent and Experiment B represents a conventional case of fully stripped solvent. Process conditions of the two experiments were basically the same except that the reboiler steam consumption in Experiment A was lower than the steam used in Experiment B.

TABLE 1

Higher $H_2S$ Loaded Solvent Reduces $H_2S$ Cosorption and Improves COS Removal in $H_2S$ Stream

|  | Experiment A | Experiment B |
|---|---|---|
|  | Higher $H_2S$ Loaded Solvent | Fully Stripped Solvent |
| Feed Gas |  |  |
| Feed gas rate, Mscfd | 25.60 | 24.77 |
| $H_2S$ content, ppmm | 8370 | 7950 |
| $CO_2$ content, % v | 2.16 | 2.24 |
| COS content, ppm | 1340 | 1330 |
| Process Conditions |  |  |
| Absorber trays | 30 | 30 |
| Stripper trays | 28 | 28 |

TABLE 1-continued

Higher $H_2S$ Loaded Solvent Reduces $H_2S$ Cosorption and Improves COS Removal in $H_2S$ Stream

|  | Experiment A | Experiment B |
|---|---|---|
|  | Higher $H_2S$ Loaded Solvent | Fully Stripped Solvent |
| L/V, gpm/MMscfd Lean Solvent Feed | 45.68 | 45.31 |
| Solvent rate, gpm | 1.684 | 1.616 |
| $H_2S$ loading, ppmw | 2110 | 220 |
| $CO_2$ loading, ppmw | 1290 | <40 |
| Temperature, F. | 146 | 121 |
| Reboiler Steam Rate |  |  |
| lbs/gal | 0.15 | 0.26 |
| pressure, psig | 107 | 101 |
| Treated Gas |  |  |
| $H_2S$ content, ppmm | 5558 | 41 |
| % $CO_2$ cosorption | 1.47 | 0.83 |
| COS, ppmm | 114 | 335 |

In convention gas treating, lowering the reboiler steam rates reduces the effectiveness of solvent stripping which results in poorer COS removal. The presence of $H_2S$ in the lean solvent usually increases the partial pressure of COS in the treated gas. Therefore, the higher the $H_2S$ loading in the lean solvent, the higher the residual COS content in the treated gas.

The data in Table 1 show that although Experiment A has a lower steam rate and a significantly higher $H_2S$ loading in the lean solvent, it does better in COS removal. Further analysis of the data shows that the high $H_2S$ loading in the lean solvent (Experiment A) as a result of solvent understripping has resulted in a reduction of $H_2S$ cosorption.

Basis the above data, the higher $H_2S$ loading (by understripping of solvents) is advantageous to the conservation of stripping energy. By purposely providing higher $H_2S$ loading in the lean solvent, one can achieve at least the same degree of COS removal with lower $H_2S$ cosorption. In Experiments A and B, this was demonstrated with a reduction in reboiler steam rate when $H_2S$ content of the lean absorbent was increased. The amount of $H_2S$ cosorption in Experiment A, with an order of magnitude higher $H_2S$ loading in the Experiment A, with an order of magnitude higher $H_2S$ loading in the "lean" solvent, is lower than that of Experiment B.

What is claimed is:

1. A process for the selective removal of carbonyl sulfide from a gas mixture also comprising hydrogen sulfide, which process comprises (a) contacting the gas mixture with an absorbent comprising from about 35% w to about 55% w of a tertiary amine; from about 5% w to about 15% w of water, and the balance being a physical co-solvent; (b) regenerating the loaded absorbent to remove substantially all of the carbonyl sulfide and most of the hydrogen sulfide to provide a lean absorbent containing hydrogen sulfide in an amount of 0.2% w to 2% w; and (c) recycling the lean absorbent to the contacting step (a).

2. A process according to claim 1 wherein the physical co-solvent is selected from sulfolanes, sulfoxides, glycols and mono- and diethers thereof, 1,3-dioxanes, 1,3-dioxolanes, aromatic ethers, aromatic hydrocarbons and N-alkylated lactams of gamma or omega amino acids.

3. A process according to claim 1 wherein the gas mixture also comprises carbon dioxide.

4. A process according to claim 1 wherein the tertiary amine is a lower alkanol amine.

5. A process according to claim 4 wherein the alkanol amine is methyl diethanol amine.

6. A process according to claim 1 wherein the physical co-sorbent is a pyrrolidone.

7. A process according to claim 6 wherein the pyrrolidone is N-methyl pyrrolidone.

8. A process according to claim 1 wherein the absorbent is an aqueous solution of methyl diethanolamine and N-methyl pyrrolidone containing from 5% w to 15% w water.

9. A process according to claim 8 wherein the methyl diethanolamine and N-methylpyrrolidone are each present in an amount of from about 40% w to about 50% w based on the weight of the total absorbent.

10. A process according to claim 8 wherein the loaded absorbent is regenerated by steam stripping.

11. A process according to claim 9 wherein the steam rate is from 0.1 to 1.5 lb of steam per gallon of solvent.

12. A process according to claim 10 wherein the hydrogen sulfide content of the lean recycle absorbent is from 0.2% w to 1.5% w.

13. A process according to claim 10 wherein the amine and co-sorbent are present at about 45% w each with the balance of the absorbent being water.

* * * * *